(12) United States Patent
Wang et al.

(10) Patent No.: US 11,727,628 B2
(45) Date of Patent: Aug. 15, 2023

(54) NEURAL OPACITY POINT CLOUD

(71) Applicant: SHANGHAITECH UNIVERSITY, Shanghai (CN)

(72) Inventors: Cen Wang, Shanghai (CN); Jingyi Yu, Shanghai (CN)

(73) Assignee: ShanghaiTech University, Shanghai (CN)

( * ) Notice: Subject to any disclaimer, the term of this patent is extended or adjusted under 35 U.S.C. 154(b) by 0 days.

(21) Appl. No.: 17/980,754

(22) Filed: Nov. 4, 2022

(65) Prior Publication Data

US 2023/0071559 A1  Mar. 9, 2023

Related U.S. Application Data

(63) Continuation of application No. PCT/CN2020/089959, filed on May 13, 2020.

(51) Int. Cl.
*G06T 15/20* (2011.01)
*G06T 7/80* (2017.01)
(Continued)

(52) U.S. Cl.
CPC ............ *G06T 15/205* (2013.01); *G06T 7/194* (2017.01); *G06T 7/55* (2017.01); *G06T 7/80* (2017.01);
(Continued)

(58) Field of Classification Search
CPC ..... G06T 15/20; G06T 15/205; G06T 15/503; G06T 2207/10028; G06T 2207/20081; G06T 2207/20084; G06T 2210/52; G06T 2210/56; G06T 7/194; G06T 7/55; G06T 7/80; G06T 2207/10024; G06T 7/74; G06T 7/251; G06N 20/00; G06N 3/08; G06V 10/82; G06V 10/806
See application file for complete search history.

(56) References Cited

U.S. PATENT DOCUMENTS

2006/0227132 A1   10/2006   Jang et al.
2018/0096463 A1   4/2018    Kim et al.

FOREIGN PATENT DOCUMENTS

CN   103955966 A   7/2014
CN   105447906 A   3/2016
(Continued)

OTHER PUBLICATIONS

Wang, Cen, et al. "Neural opacity point cloud." IEEE Transactions on Pattern Analysis and Machine Intelligence 42.7 (2020): 1570-1581. (Year: 2020).*

(Continued)

*Primary Examiner* — Xiao M Wu
*Assistant Examiner* — Scott E Sonners
(74) *Attorney, Agent, or Firm* — Sheppard Mullin Richter & Hampton LLP

(57) ABSTRACT

A method of rendering an object is provided. The method comprises: encoding a feature vector to each point in a point cloud for an object, wherein the feature vector comprises an alpha matte; projecting each point in the point cloud and the corresponding feature vector to a target view to compute a feature map; and using a neural rendering network to decode the feature map into a RGB image and the alpha matte and to update the feature vector.

25 Claims, 12 Drawing Sheets

(51) Int. Cl.
　　　*G06T 7/55*　　　(2017.01)
　　　*G06T 7/194*　　(2017.01)
　　　*G06T 15/50*　　(2011.01)

(52) U.S. Cl.
　　　CPC ............ *G06T 15/20* (2013.01); *G06T 15/503* (2013.01); *G06T 2207/10028* (2013.01); *G06T 2207/20081* (2013.01); *G06T 2207/20084* (2013.01); *G06T 2210/52* (2013.01); *G06T 2210/56* (2013.01)

(56) References Cited

FOREIGN PATENT DOCUMENTS

| CN | 109389664 A | 2/2019 |
|---|---|---|
| CN | 111127610 A | 5/2020 |

OTHER PUBLICATIONS

Image-based 3D photography using opacity hulls. ACM Transactions on Graphics (TOG) 21.3 (2002): 427-437 (Year: 2002).*

PCT International Search Report and the Written Opinion dated Feb. 18, 2021, issued in corresponding International Application No. PCT/CN2020/089959 (9 pages).

Qiang Qiu, "Research on Fast 3D Model Rendering Technology Based on Point-Cloud", Information Science and Technology, No. 2, Feb. 15, 2020, with English language abstract.

* cited by examiner

NEURAL OPACITY POINT CLOUD

CROSS-REFERENCE TO RELATED APPLICATION

This application is a continuation application of International Patent Application No. PCT/CN2020/089959, filed on May 13, 2020. The above-referenced application is incorporated herein by reference in its entirety.

TECHNICAL FILED

This invention relates generally to the field of image processing, computer graphics and computer vision, and more specifically, to multi-view fuzzy objects rendering via neural opacity point cloud.

BACKGROUND

With the latest advances in both passive and active 3D scanning, high quality 3D reconstruction of complex objects has become increasingly accessible. However, realistic and accurate appearance capture remains challenging. The latest solutions either rely on using complex illumination systems and data processing techniques, or require substantial manual involvement for fitting parametric appearance models to actual objects. A particularly challenging case is fuzzy materials such as hair, fur, and feathers. Such objects exhibit strong view-dependent opacity that is difficult to model in both geometry and appearance.

Embodiments of the present invention combine image-based modeling and rendering (IBMR) and neural rendering (NR) to produce photorealistic appearance of furry objects. Traditional IBMR techniques such as the lumigraph and light field directly employ images captured under real settings and interpolate new views from the captured ones, with or without using geometry proxies. To handle opacity objects, image-based opacity hull (IBOH) acquires the images and their corresponding alpha mattes of an object from different viewpoints and constructs a volumetric representation and computes an angular opacity map for each voxel. However, the most common visual artifacts in IBOH are ghosting or aliasing caused by insufficient view samples. This problem normally can be mitigated by using high quality geometry proxies. However, for furry objects, obtaining accurate geometry is intractable—as fur and hair contains tens of thousands of thin fibers and their mutual occlusions are the fundamental causes of translucency. Without accurate geometry proxy models for furry objects, IBOH exhibits excessive blurs in the rendered alpha matte.

It is to be noted that the above information disclosed in this Background section is only for facilitating the understanding of the background of this invention, and therefore may contain information that is already known to a person of ordinary skill in the art.

SUMMARY

In view of the limitations of existing technologies described above, the present invention provides multi-view fuzzy objects rendering via neural opacity point cloud that address the aforementioned limitations. Additional features and advantages of this invention will become apparent from the following detailed descriptions.

One aspect of the present invention is directed to a method of rendering an object. The method may comprise encoding a feature vector to each point in a point cloud for an object, projecting the points in the point cloud and the corresponding feature vectors to a target view to compute a feature map, and using a neural rendering network to decode the feature map into a RGB image and an alpha matte and to update the point vectors. The feature vector may comprise an alpha matte.

In some embodiments, the method may further comprise rasterizing a point in the point cloud into a patch on the feature map. The size of the patch may be determined by a depth value of the point.

In some embodiments, the method may further comprise associating each point in the point cloud with a set of pixels on the feature map.

In some embodiments, the method may further comprise back propagating a gradient of a loss function in the feature map to a gradient on the point cloud.

In some embodiments, the neural rendering network may comprise a first encoder and a first decoder for processing the RGB images, and a second encoder and a second decoder for processing the alpha mattes.

In some embodiments, the first encoder may adopt U-Net architecture while replacing a convolutional layer in U-Net architecture with a gated convolution layer.

In some embodiments, the first encoder may comprise one input convolution block and four down-sampling blocks.

In some embodiments, the first decoder may comprise one output convolution block and four upsampling blocks.

In some embodiments, the method may further comprise obtaining an input to an upsampling block of the first decoder by concatenating intermediate feature maps from both the first encoder and a previous upsampling block.

In some embodiments, the second encoder may comprise one input convolution block and two down-sampling blocks.

In some embodiments, the second decoder may comprise one output convolution block and two upsampling blocks.

In some embodiments, the method may further comprise obtaining an input to an upsampling block of the second decoder by concatenating intermediate feature maps from both the first encoder and the second encoder.

In some embodiments, the method may further comprise capturing a plurality of images of the object by a plurality of cameras from a plurality of viewpoints, and constructing the point cloud using an image-based visual hull construction.

In some embodiments, the method may further comprise rotating the object at a constant speed, and capturing the plurality of images of the object at a fixed interval by the plurality of cameras from a plurality of viewpoints.

In some embodiments, the method may further comprise capturing images of a calibration pattern rotating at the constant speed by a calibration camera at the fixed interval.

In some embodiments, the method may further comprise calibrating the plurality of images by calculating an extrinsic parameter of the calibration camera via a structure-from-motion (SFM) technique.

In some embodiments, the method may further comprise generating an alpha matte for each image by obtaining a foreground binary mask and refining the foreground binary mask by a deep neural network.

In some embodiments, the method may further comprise generating a trimap from the foreground binary mask.

In some embodiments, the deep neural network may comprise two parallel encoder branches for local feature extraction and global contextual information.

In some embodiments, the method may further comprise constructing the point cloud of the object from the foreground binary mask using the image-based visual hull construction.

In some embodiments, the method may further comprise training the deep neural network using the images and the corresponding alpha mattes.

In some embodiments, one of the plurality of the cameras is set as the target camera.

In some embodiments, the method may further comprise back-propagating a gradient of a loss function of the images to the point cloud.

In some embodiments, the method may further comprise performing two-dimensional image transformation to the images.

In some embodiments, the object may comprise hair.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of the description, illustrate embodiments consistent with this invention and, together with the description, serve to explain the disclosed principles. It is apparent that these drawings present only some embodiments of this invention and those of ordinary skill in the art may obtain drawings of other embodiments from them without exerting any creative effort.

DETAILED DESCRIPTION OF THE EMBODIMENTS

Figure 1:
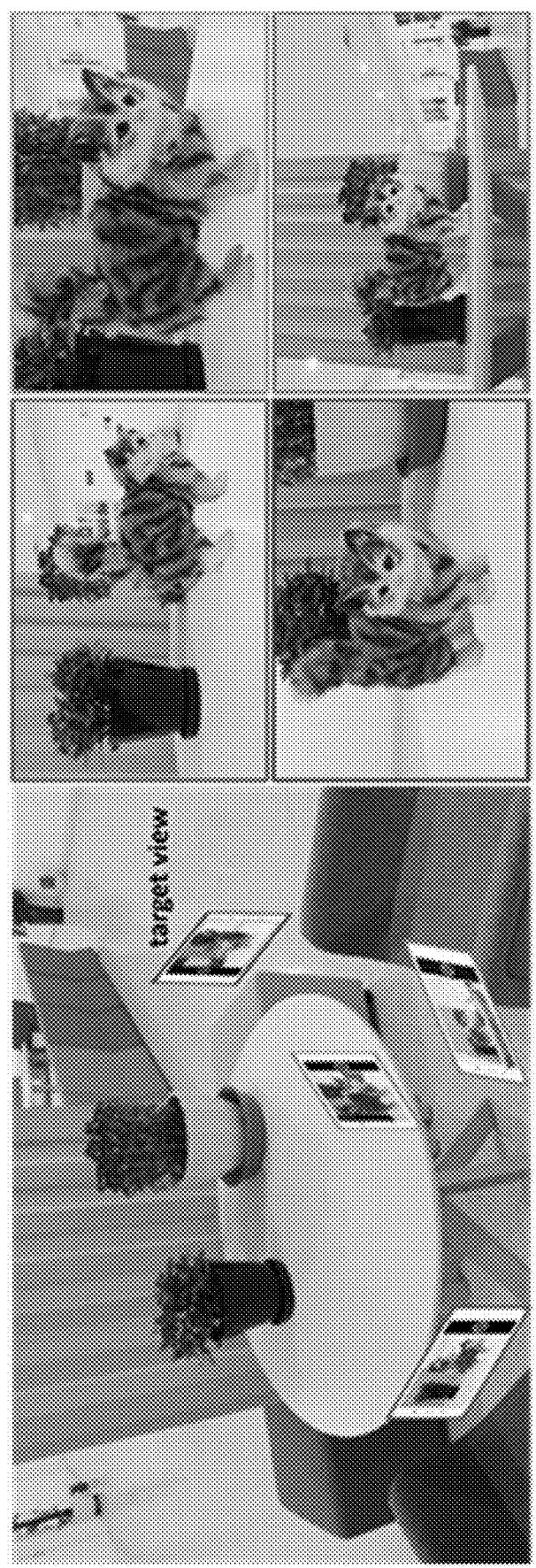
FIG. 1 is an exemplary diagram showing the Neural Opacity Point Cloud (NOPC) renderer in accordance with one embodiment of the present invention.

Exemplary embodiments will now be described more fully with reference to the accompanying drawings. However, these exemplary embodiments can be implemented in many forms and should not be construed as being limited to those set forth herein. Rather, these embodiments are presented to provide a full and thorough understanding of this invention and to fully convey the concepts of the exemplary embodiments to others skilled in the art.

In addition, the described features, structures, and characteristics may be combined in any suitable manner in one or more embodiments. In the following detailed description, many specific details are set forth to provide a more thorough understanding of this invention. However, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

1. Introduction

Embodiments of the present invention resort to neural rendering (NR) and present a novel technique called neural opacity point cloud (NOPC). Recent NR techniques exploit image/scene representations and encode the rendering process and rules into a deep network and eliminates the need of using highly accurate 3D geometry. For example, one existing approach proposed an NR technique based on low-level 2D image representations to significantly improve the image quality of the final rendering results. However, such approach is not yet capable of handling opacity induced by 3D hair/fur fibers that would require convolution in 3D space. Alternative NR techniques based on 3D geometry rely heavily on the quality of the 3D mesh. In the current case where only noisy point clouds of hair fibers are available, such methods cannot obtain satisfactory results.

In contrast, NOPC uses a point cloud as training data along with RGBA (RGB and alpha) images captured at a relatively sparse sampling of viewpoints. NOPC consists of two modules. The first module aims to learn a neural feature based on local geometry and appearance around a 3D point. By embedding the feature descriptor to all points, a feature map can be obtained at every new viewpoint. The second module focuses on rendering, and an U-Net-based NR is extended by enhancing its translation equivariance capability to allow rendering at arbitrary viewpoints. Specifically, gated convolution layers are added to robustly handle noisy and corrupted 3D geometry. At the same time, the RGB sampling branch in the network is expanded with a new alpha prediction branch that effectively enhances the performance of the entire model.

Comprehensive experiments have been conducted using NOPC to render a variety of traditionally challenging objects such as human hair and furry toys. Specifically, a multi-view capture system is presented, along with companion point cloud generation methods and automatic matte generation schemes at the sample views. The dataset consists of 7 different hairstyles or furry toys, each with a total of 400+ calibrated images with their corresponding alpha mattes, which is the first of its kind tailored for neural opacity rendering. It's shown that NOPC can produce photorealistic opacity rendering on real data. Additional experiments on synthetic data show that NOPC outperforms existing neural rendering and image-based rendering such as IBOH in both accuracy and appearance.

2. Related Work

2.1 Image-Based Rendering (IBR)

IBR techniques aim to blend sampling views to synthesize new views. When the images are densely sampled or when their appearances are similar, simple interpolation schemes produce reasonable results. However, when the images exhibit large discrepancies or nearby images exhibit small overlaps, interpolations can produce strong visual artifacts such as ghosting and aliasing. Although correspondence matching can be used to reduce such artifacts, the resulted images may appear excessively smooth. Alternatively, geometry may be used to guide the interpolation scheme. For example, the unstructured lumigraph uses geometry proxies to assist the selection of views/rays to conduct cross-projection and view-dependent blending. When the geometry proxy well approximates the ground truth, the rendering quality is comparable to the ground truth. However, for furry objects such as hair, it is nearly impossible to produce proxy geometry. Optical flows can also be integrated with IBR to reduce the ghosting artifacts, but it relies on richness of texture. Some recent approaches present a soft 3D model that accounts for both depth and visibility. However, they can only improve occlusion boundaries but not opacity. Other techniques either exploit view-specific geometry or rely on regular ray sampling such as the light field. However, none of those approaches is tailored to handle objects with opacity, and the results are not optimal.

Another approach, IBOH, generates a view-dependent volumetric representation. The idea is to capture view-dependent partial occupancy of a foreground object with respect to the background. Unlike traditional visual hulls that can use polygonal shapes as geometry proxy, IBOH has to use a volumetric proxy. At each voxel, a view-dependent alpha map is stored where new alpha values can be interpolated on the map. The approach is analogous to the surface light field, except that the latter uses a mesh representation to significantly reduce the storage requirements. IBOH has shown promising results when the sampling is ultra-dense, but is lacking when the sampling is sparse. This is because view-dependent alpha maps for a voxel can be highly discontinuous and interpolation is only valid when its densely sampled.

2.2 Neural Rendering

The recent class of neural rendering (NR) techniques are also related to the present invention, which exploit the denoising and super-resolution capabilities of neural networks. It may even be possible to combine IBR and NR, for example, by improving estimating the blend weights, or by improve predicting the optical flow. Like traditional IBR techniques, their improvement to opacity rendering is limited as they rely on highly accurate estimation of the optical flow and/or proxy geometry, which is prohibitive for furry objects. Most recent NR techniques attempt to eliminate the need of high fidelity geometry by encoding the rendering process and rules directly into a deep network. For example, some existing methods use low-level 2D features and manage to produce superior quality rendering. Yet, opacity is inherently caused by 3D occlusions, and 2D features are not yet sufficient for producing high quality translucency. NR based on 3D geometry relies on the completeness and the quality of the mesh. For furry objects, it is nearly impossible to represent the geometry as a mesh.

2.3 Image Matting

NOPC assumes a known alpha matte of each input view and benefits from recent automatic matte generation techniques. Natural image matting usually requires scribble or trimap as input with the image. Traditional alpha matting is generally divided into two categories, color sampling and alpha propagation. Color sampling methods sample colors from nearby known regions for a given pixel of unknown region. According to a local smoothness assumption on color of foreground and background, these sampling colors can be used to calculate the corresponding alpha value. Many color sampling methods are based on this assumption, including Bayesian matting, shared sampling matting, global sampling matting, and sparse coding matting. Alpha propagation methods propagate alpha values from known regions into unknown regions using affinity between pixels. These methods include closed-form matting, Poisson matting, random walk matting, KNN matting and information-flow matting. Recently, several deep learning works have been proposed for image matting. Instead of using scribble or trimap based techniques that require excessive manual inputs, automatic matting techniques use deep learning to directly generate the trimap. For example, some existing methods use an end-to-end CNNs to automatically compute alpha mattes for portrait photos comparable to the manually labeled results. In the embodiments of the present invention, NOPC also adopts one of the latest automatic matte generation techniques to produce RGBA inputs.

3. Neural Opacity Point Cloud

In the present invention, a novel NOPC framework is presented for rendering fuzzy objects. FIG. 1 is an exemplary diagram showing the Neural Opacity Point Cloud (NOPC) renderer in accordance with one embodiment of the present invention. As shown in FIG. 1, the NOPC renderer in accordance with one embodiment of the present invention may produce photorealistic, free viewpoint rendering of fuzzy objects from a sparsely sampled images.

Figure 2:
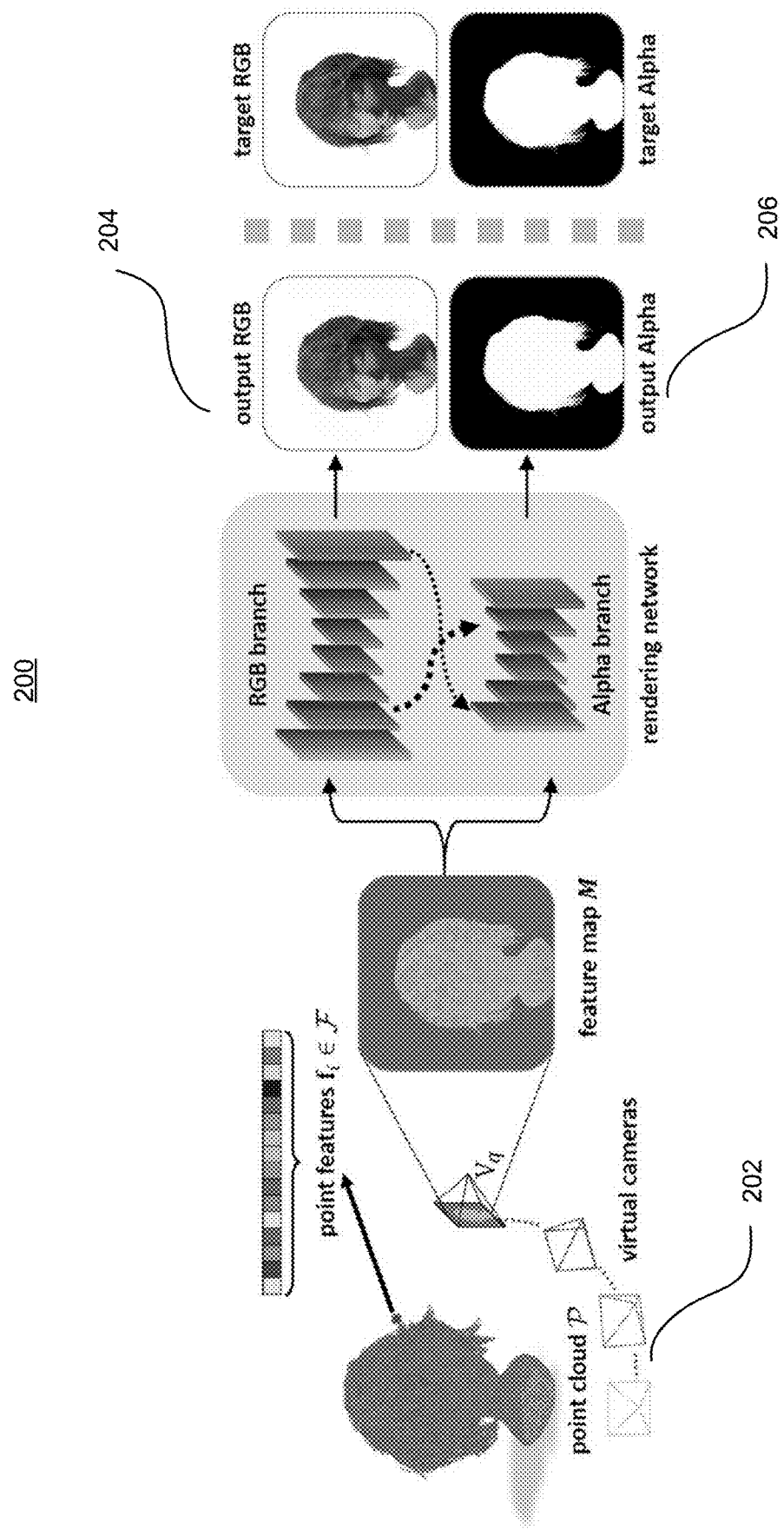
FIG. 2 is an exemplary diagram showing the NOPC framework in accordance with one embodiment of the present invention.

FIG. 2 is an exemplary diagram showing the NOPC framework 200 in accordance with one embodiment of the present invention. As shown in FIG. 2, the input to NOPC 200 is the 3D reconstructed point cloud of the object 202 along with its calibrated, multi-view imagery data. NOPC then produces a RGBA (i.e., RGB 204+alpha 206) rendering of the object from any new viewpoint.

The notations are explained as follows. For an opacity object, $\mathcal{P}$ and $\mathcal{F}$ denote the point cloud and the m-dimensional feature of point respectively. Specifically, $\mathcal{P}$ $\{p_i \in \mathbb{R}^3\}_{i=1}^{n_p}$, $\mathcal{F} = \{f_i \in \mathbb{R}^m\}_{i=1}^{n_p}$, where $n_p$ is the number of points. There are $n_q$ images from various viewpoint in the training data. $I_q$ and $A_q$ denote the RGB image and alpha matte from $q^{th}$ viewpoint $V_q$ respectively, and the intrinsic and extrinsic camera parameters for $V_q$ are represented as $K_q$ and $E_q$. $\Omega$ denotes the point projection described in Section 3.2. $\mathcal{R}_\theta$ is the neural renderer to produce the resulting RGB image $\tilde{I}$ and alpha matte $\tilde{A}$ as:

$$\tilde{I}, \tilde{A} = \mathcal{R}((\Psi(\mathcal{P}, \mathcal{F}, K_q, E_q)) \qquad (1)$$

3.1 Training Data Acquisition

Different from traditional 3D rendering, fuzzy objects cannot be directly reconstructed using standard multi-view stereo techniques such as structure-from-motion (SFM). Active depth sensors such as time-of-flight or structured light will also produce extremely noisy and unstable reconstruction. Instead, the present invention relies on visual hull type reconstruction. To construct a visual hull, an object mask needs to be obtained at each input viewpoint. In the embodiments of the present invention, automatic matting techniques are applied to first extract the alpha matte at the viewpoint. Next, a threshold is set to the matte to obtain a binary foreground mask. In all the experiments, the threshold may be set as 0.2 so that nearly all foreground is covered without introducing too much background. The experiments show that the present rendering technique is less sensitive to the quality of the geometry and even if the geometry is not accurate, satisfactory rendering can still be produced.

From the foreground masks and along with camera calibration, a visual hull representation of the object can be constructed. Please note that silhouettes can be used to construct either a polygonal mesh (e.g., an image-based visual hull) or a volumetric point cloud. In the present invention, the latter is chosen for several reasons. First, fuzzy objects especially the ones composed of fur or hair can contain thousands of fibers, and the polygonal representation provides an overly strong smoothness that prohibits alpha estimation near these fibers. Second, the polygon representations force 3D points to lie on piecewise planar surfaces whereas real hair fibers are more random in depth ordering and shape. In fact, the goal is to precisely learn opacity distribution at each voxel, and therefore the point representation is more suitable.

Figure 3:
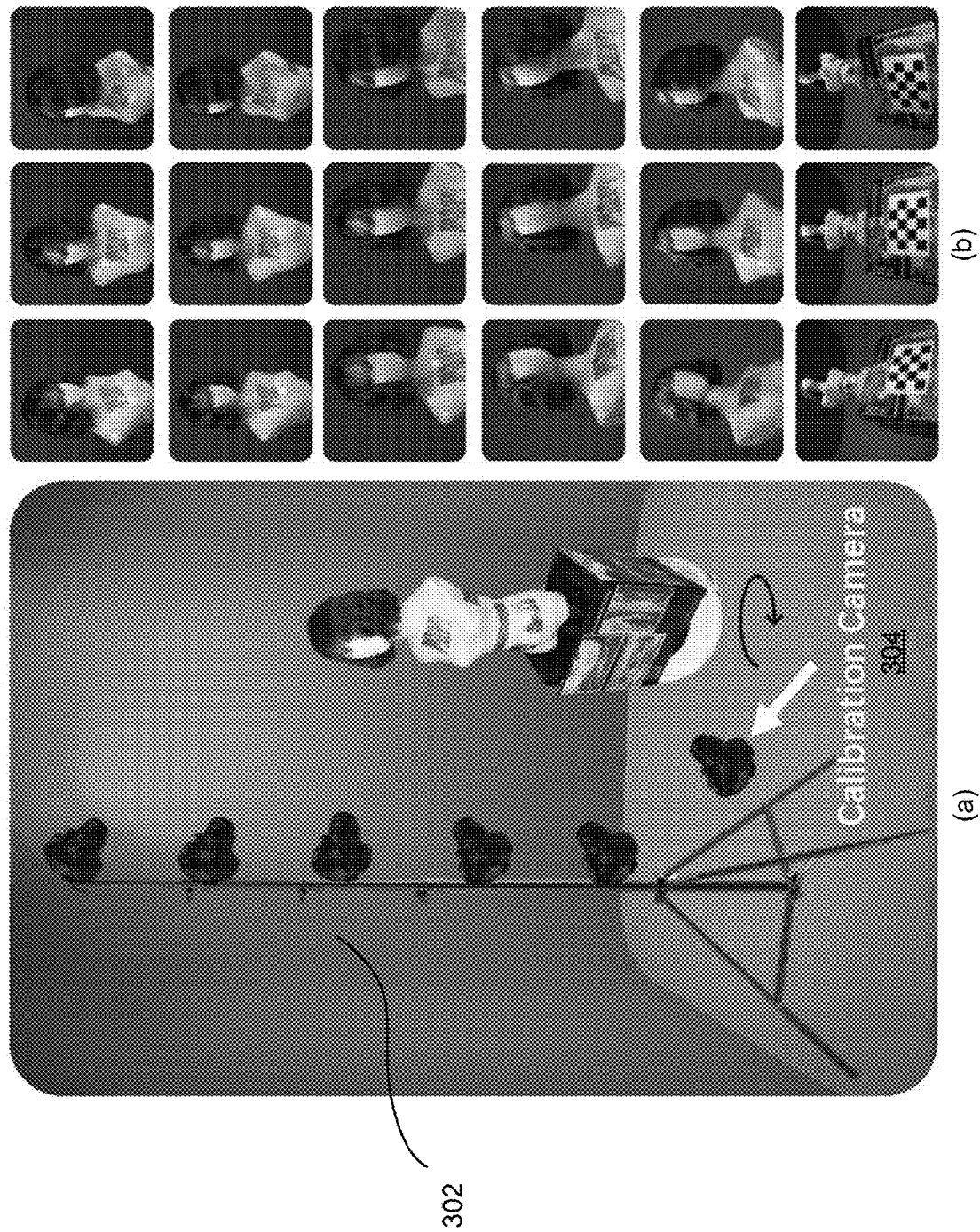
FIG. 3 is an exemplary diagram showing (a) the capture system including a calibrated camera and (b) the sample captured images, in accordance with one embodiment of the present invention.

Capture Systems. Opacity object data is quite different from standard 3D reconstruction data in existing approaches. FIG. 3 is an exemplary diagram showing (a) the capture system 302 including a calibrated camera 304 and (b) the sample captured images, in accordance with one embodiment of the present invention. As shown in FIG. 3, the capture system 302 including a calibrated camera 304 is presented in image (a) of FIG. 3, and the sample captured images are presented in image (b) of FIG. 3. Specifically, an object is placed on a turntable rotating at a constant speed with the green screen as the background. When capturing images, the cameras are kept as still. A simple turntable system may be constructed with five 16 mm C-mount cameras facing towards the object at different viewpoints and one 8 mm camera facing a calibration pattern, which is a sparse multi-view capture system. Two frames are captured per second. The images captured by the five 16 mm C-mount cameras contain RGB and alpha (described in the following section) and serve as training data. Images captured by the 8 mm C-mount camera are only used for camera calibration.

Calibrations. The reason an auxiliary calibration camera is used is that fuzzy object are particularly difficult to reconstruct using structure-from-motion (SFM) techniques. Though other dome systems can directly calibrate the cameras via the reconstruction process, they are unreliable on fuzzy objects. It's to be noted that the training images are sparser compared with previous NR or IBR inputs. However, as shown in the results section, the alpha estimation of the present invention is still reliable. The calibration process is divided into three steps. First, the intrinsic and extrinsic camera parameters of the six cameras are computed in the calibration camera coordinate system. The calibration approach is based on Bouguet's toolbox and Zhang's camera calibration. For the $i^{th}$ camera, its intrinsic parameter is KL and its extrinsic parameter is E (from calibration camera coordinate system to $i^{th}$ camera coordinate system). Second, the extrinsic parameter of the calibration camera is calculated in the model coordinate system for each frame via SFM pipeline. In the model coordinate system, the extrinsic parameter of the viewpoint corresponding to the $f^{th}$ frame is $E_c^f$. Finally, the extrinsic parameter $E_i^f$ of the $i^{th}$ camera in the model coordinate system at the $f^{th}$ frame can be calculated as:

$$E_q = E_i^f = E_i' E_c^f \tag{2}$$

which means each camera in a frame corresponding to a viewpoint $V_q$.

Matte Generation. Alpha mattes at respective views are used to conduct supervised learning in the present networks. However, image matting is an ill-posed problem due to its formulation. Such problem may be solved by combining deep learning and green screening. Specifically, with green screening, an initial foreground binary mask can be obtained via chrome key segmentation and background subtraction. However, these binary masks fail to perfectly align with the boundaries of the foreground object. Thus, a deep context-aware matting is adopted to refine the mask and then produce the final alpha matte.

Figure 4:
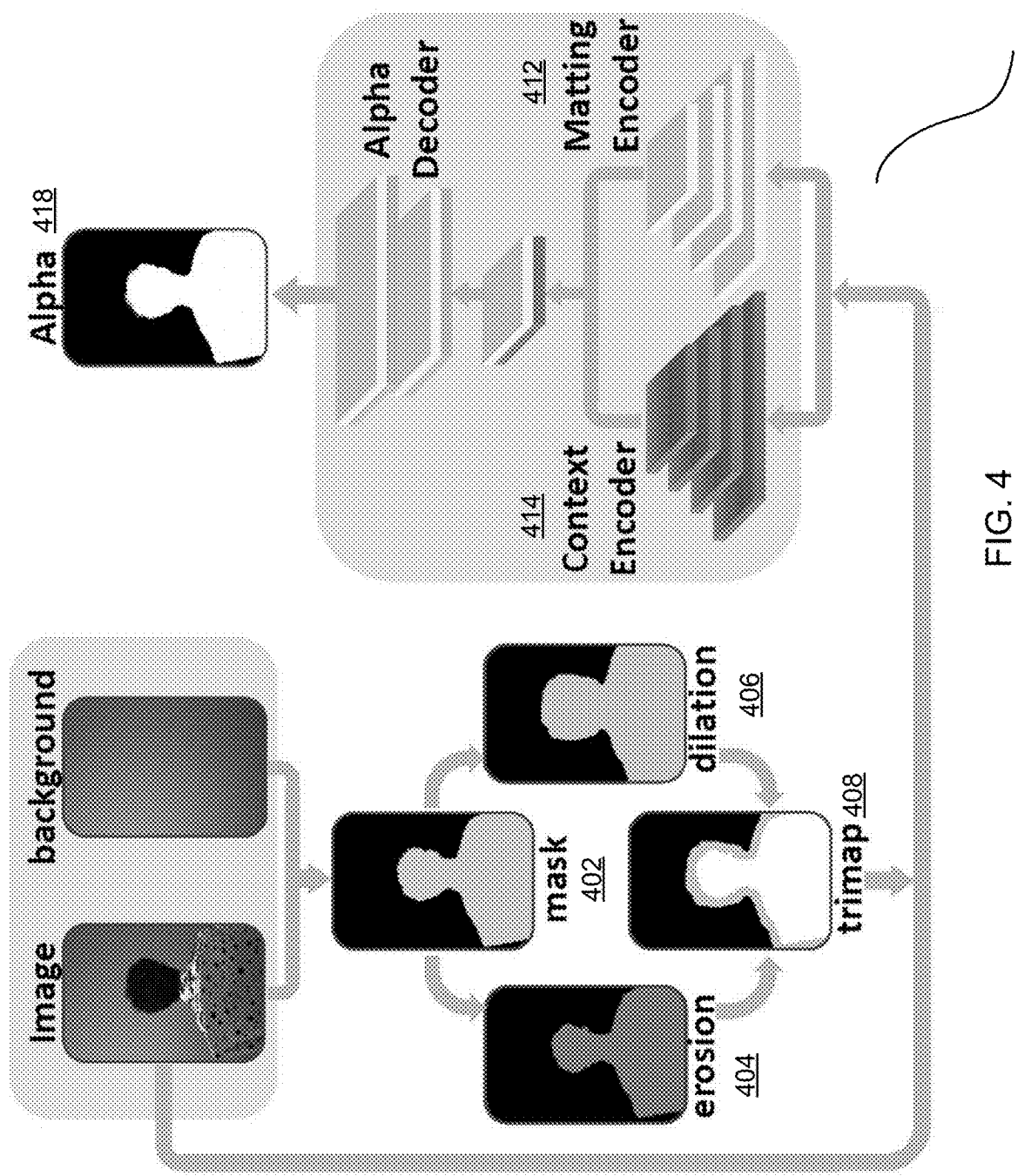
FIG. 4 is an exemplary diagram showing the production of training data (i.e., the ground truth) by adopting deep context-aware matting in accordance with one embodiment of the present invention, wherein the trimap is generated from an object mask.

FIG. 4 is an exemplary diagram showing the production of training data (i.e., the ground truth) by adopting deep context-aware matting in accordance with one embodiment of the present invention, wherein the trimap is generated from an object mask. As shown in FIG. 4, in order to produce training data such as the ground truth, deep context-aware matting is adopted, wherein the trimap 408 is generated from an object mask 402. Specifically, a trimap 408 is generated from the refined binary mask using morphological operators (erosion and dilation): image area after erosion is treated as the foreground 404, the area outside the dilated mask as the background 406, and the rest as unknown. The context-aware network 410 can be applied afterwards to predict alpha matte 418 from the trimap 408 and the RGB image.

To briefly reiterate, the context-aware network 410 contains a two-encoder-two-decoder deep neural network for simultaneous foreground and alpha matte estimations. It builds upon the Xception 65 architecture and has the benefits of both local propagation and global contextual information. The network consists of two parallel encoder branches: Matting Encoder (ME) 412 and Context Encoder (CE) 414. ME 412 uses a down-sampling factor of 4 to focus on local feature extraction while maintaining sufficient spatial coherence, whereas CE 414 uses a down-sampling factor of 16 so that it captures a larger receptive field for extracting global contextual information.

The encoded feature maps from CE 414 are bilinearly upsampled to have the same size of ME 412 and both feature maps are concatenated. The results are fed into two decoder branches to produce the foreground image and the alpha matte 418. Specifically, the decoders use the same network architecture with 2 bilinear upsampling layer, each of which concatenated with intermediate features from the CE 414 using a skip connection followed by 3×3 layers of 64 channels, as shown in FIG. 4. The network is trained using the matte dataset and produce an alpha matte a for each view.

Figure 6:
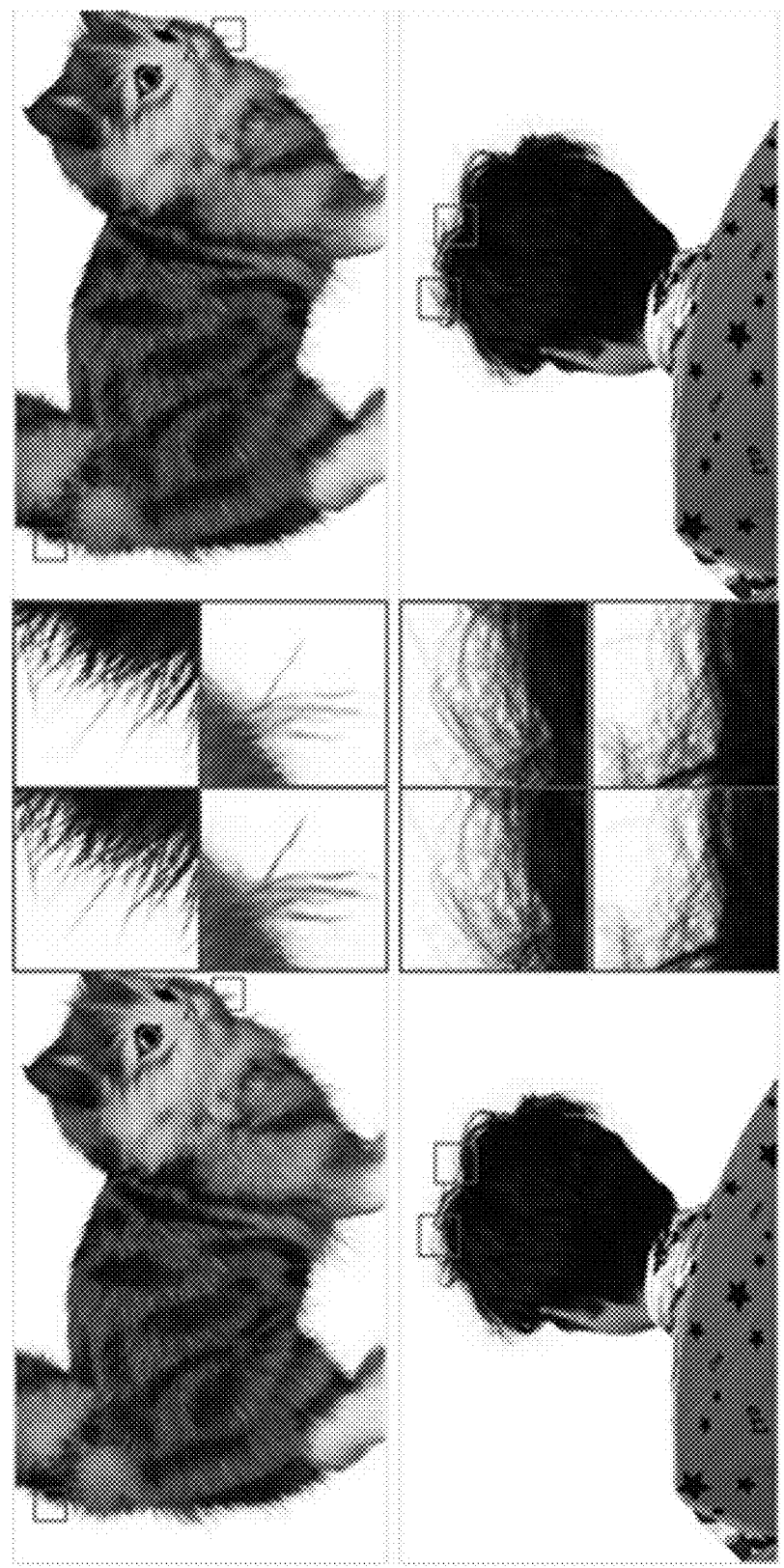
FIG. 6 is an exemplary diagram showing (a) the introduction of color leakage by using green screen and (b) the fix of color leakage, in accordance with one embodiment of the present invention.

FIG. 6 is an exemplary diagram showing (a) the introduction of color leakage by using green screen and (b) the fix of color leakage, in accordance with one embodiment of the present invention. As shown in image (a) of FIG. 6, green screening enables more efficient and reliable background segmentation but introduces color leakage. Under matting, $I=\alpha F+(1-\alpha)B$, $\alpha \in [0,1]$, where the background B is pre-captured. To reduce color leakage, I' is computed as:

$$I'_j = \begin{cases} \min\left(\frac{I_j - (1.0-\alpha)B_j}{\alpha_j}, 255\right) & \alpha_j \geq \epsilon \\ I_j & \alpha_j < \epsilon \end{cases} \quad (3)$$

where j is the location of the pixel; E is a threshold (set to 0.2 in the embodiments of the present invention) to suppress noise. As shown in image (b) of FIG. 6, the color leakage is fixed.

3.2 Feature Projection

The first step of the present neural rendering is to assign to each 3D point $p_i$ a feature vector $f_i$ that encodes the object's appearance, its alpha matte, and its contextual information. When rendering a novel target viewpoint V, all points and thus their features are projected onto a view-dependent feature map $M_q$. A neural rendering network $\mathcal{R}_\Theta$ then decodes the feature map to a RGB image with alpha matte.

View-dependent Feature Map. Given a point cloud $\mathcal{P}$ with its feature $\mathcal{F}$, a viewpoint $V_q$ with center-of-center of $c_q$, known intrinsic and extrinsic camera parameters $K_q$ and $E_q$, each point $p_i$ is projected to:

$$[x_i; y_i; z_i] = E_q p_i \quad (4)$$
$$[u_i; v_i; 1] = \frac{1}{z_i} K_q \cdot [x_i; y_i; z_i]$$

where $u_i$ and $v_i$ are the projected pixel coordinates of $p_i$.

A view-dependent feature map $M_q$ with m+3 channels is first computed. The goal is to adopt a rasterization technique that projects all points onto pixels to form the first m channels (with correct ordering). This is analogous to z-buffer in rasterization-based rendering, except that it is applied to the point cloud rather than triangles and the projected values are its feature map instead of color. The final three channels record the normalized view direction of the point as $$\vec{d}_i = \frac{p_i - c_q}{\|p_i - c_q\|_2}.$$

The feature map $M_q$ is initialized as $[f_0;0]$ where $f_0$ is the default feature obtained from training. Similar to point based rendering techniques, splatting is applied to reduce holes. This step rasterizes a point into a patch (square) on the image whose size is determined by the depth value $z_i$ of $p_i$: the smaller the $z_i$, the larger the size. Splatting is also used to interpolate the z values and use the Z-buffer to maintain correct depth ordering and hence occlusions. This process allows each 3D point be associated with a set of pixels. Let $\mathcal{S} = \{(u,v)|p_i$ is splatted on $(u,v)$ and visible$\}$ be the set of pixels in the viewpoint that map to the same 3D point $p_i$ under splatting.

The resulting feature map $M_q$ hence is:

$$M_q = [u, v] = \begin{cases} [f_i; \vec{d}_i] & (u, v) \in \mathcal{S}_i \\ [f_0; 0] & \text{otherwise} \end{cases} \quad (5)$$

Update Point Features. Once pixels are associated to points, the gradients of a specific loss function in the image space are back propagated to the ones on the point cloud: gradients on pixels are mapped to points visible in $M_q$ while assigning zero gradients to the invisible points.

Given $$\frac{\partial \mathcal{L}}{\partial M_q}$$

as the gradient of the loss with respect to the feature map, the gradient of the loss with respect to $f_i$ can be calculated as follows:

$$\frac{\partial \mathcal{L}}{\partial f_i} = \begin{cases} \sum_{s \in \mathcal{S}_i} \rho\left(\frac{\partial \mathcal{L}}{\partial M_q}(s)\right) & |\mathcal{S}_i| > 0 \\ 0 & |\mathcal{S}_i| = 0 \end{cases} \quad (6)$$

where $\rho(\cdot)$ slices the first m dimensions of a vector.

Under this formation, the network is managed to be made differentiable and hence can be trained end-to-end.

3.3 Neural Opacity Rendering

Recent learning-based natural image matting techniques have shown that it is insufficient to use local features alone for automatic alpha prediction. For example, some existing methods employ global feature for reliable alpha and foreground estimation. This is not surprising since RGB image synthesis generally relies on high-level features such as global semantics and its accuracy directly affects alpha estimation. Based on this observation, a new neural rendering network $\mathcal{R}_e$ that takes view-dependent feature map $M_q$ as inputs and produces RGB image and alpha matte with local and global features is employed.

Figure 5:
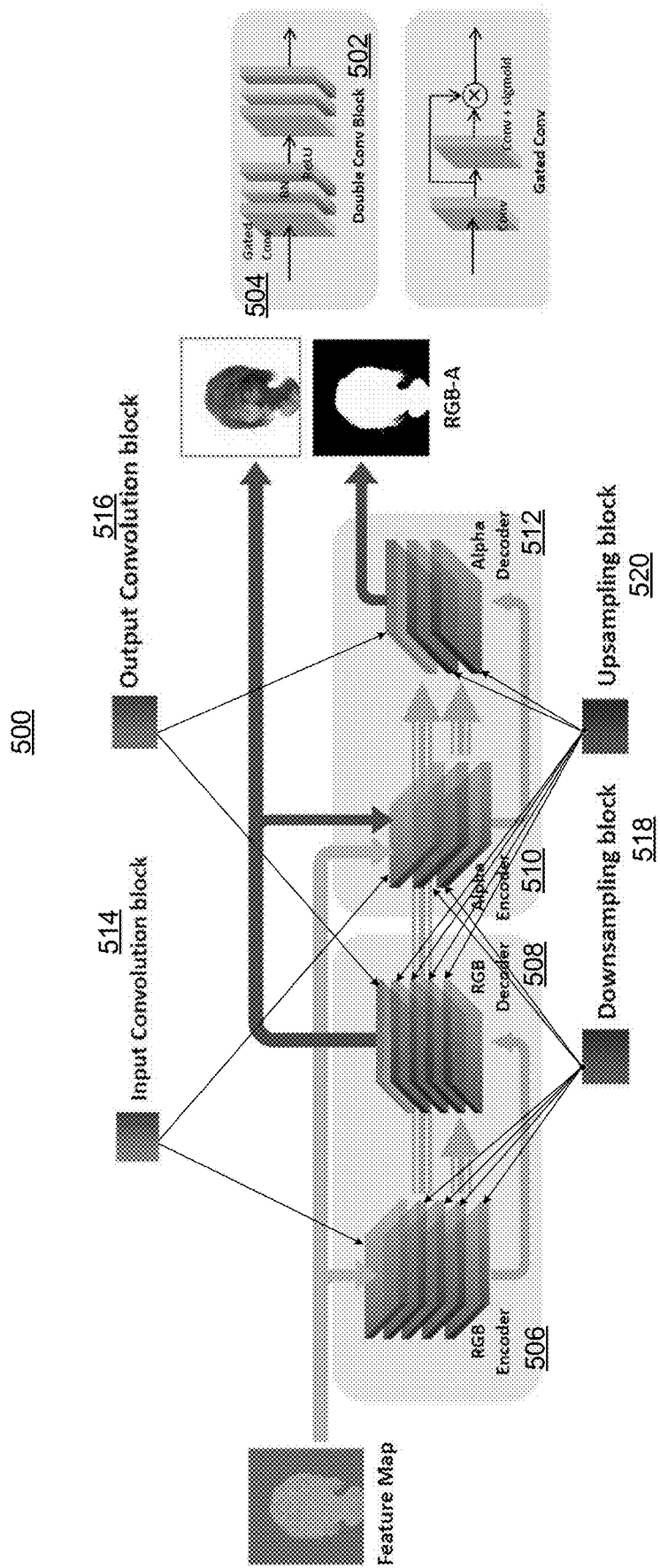
FIG. 5 is an exemplary diagram showing the multiple-branch encoder-decoder network employed in accordance with one embodiment of the present invention, wherein the convolution layer in the double convolution blocks of the U-net is replaced with gated convolution layer for denoising and hole filling.

FIG. 5 is an exemplary diagram showing the multiple-branch encoder-decoder network 500 employed in accordance with one embodiment of the present invention, wherein the convolution layer in the double convolution blocks 502 of the U-net is replaced with gated convolution layer 504 for denoising and hole filling. As shown in FIG. 5, the NOPC network $\mathcal{R}_\Theta$ 500 in accordance with one embodiment of the present invention is presented. The alpha matte decoder 512 uses both the output from its own encoder layer and shallow layer intermediate representations from the RGB encoder 506. High-level features from RGB and local-level features from alpha are integrated for alpha inference without affecting RGB image synthesis.

RGB Encoder and Decoder. For RGB image synthesis, it's observed that the volumetric reconstruction still exhibits holes and noise. Therefore, the recent U-Net architecture is adopted while the original convolution is replaced with gated convolution. The substitution enhances the denoising and image completion capabilities of the network so that even with a low quality 3D point cloud, the RGB rendering appears realistic. As shown in FIG. 5, the RGB encoder 506 is composed of one input convolution block 514 and four down-sampling blocks 518 to extract high-level features.

The input convolution block 514 preserves the image size of the input, the down-sampling blocks 518 reduce the image size by half whereas the channels double the input images. The RGB decoder 508 uses four upsampling blocks 520 and an output convolution block 516 to upsample the feature map that are generated by concatenating intermediate features extracted from the corresponding level of the RGB encoders 506 and from the previous level of the decoder. Using four upsampling blocks 520, a feature map at the same resolution of $M_q$ can be produced. The output convolution block 516 reduces the channel number to 3.

Alpha Encoder and Decoder. It's observed that alpha mattes are sensitive to low-level features such as image gradients and edges. Therefore, the depth of the alpha encoder 510 and the channels at each layer are reduced. Specifically, only one input convolution block 514 and two down-sampling blocks 518 are used so that the channel number is only ⅔ of the RGB encoder 506. The RGB encoder 506 and the alpha encoder 510 are separated to allow independent learning of the corresponding high-level and low-level features. The reduction of layers in the alpha encoder 510 further reduces the computational and memory overhead. The alpha decoder 512 has an identical depth of the alpha encoder 510 with two upsampling blocks 520 and one output convolution block 516. The input to each upsampling block 520 is obtained by concatenating intermediate feature maps from both the alpha encoder 510 and the RGB encoder 506. Such a structure enables contextual information and produces more reliable alpha matte estimation especially when the image exhibits strong high-level features.

Loss Function. Since the training process uses the RGB images I and alpha mattes A captured by real cameras, it's noticed that the captured images often contain elements of the background such as frames, lights and shadow. In order to avoid the impact of these elements on network training, the valid ROI mask G for an object is calculated before computing the loss. G is the union of alpha matte A and the depth map of the point cloud. Then the mask is extended using dilation and the loss within the region covered by the mask as $\Omega(I,G)$ is calculated.

Here the aim is to render fuzzy objects such as hair that exhibit many fine details. To better preserve details in neural rendering, a perceptual term is added to the loss function with the mean squared error (MSE). Let $f_{vgg}(\cdot)$ denotes the output feature of the third-layer of pretrained VGG-19, the perceptual loss can be defined as:

$$\mathcal{L}_{gb} = \Delta(f_{vgg}(\Omega(I_q,G)), f_{vgg}(\Omega(\tilde{I},G)))$$

$$\mathcal{L}_{\alpha} = \Delta(f_{vgg}(\Omega(A_q,G)), f_{vgg}(\Omega(\tilde{A},G))) \quad (7)$$

The final loss function is defined as:

$$\mathcal{L}_{overall} = \mathcal{L}_{rgb} + \mathcal{L}_{\alpha} \quad (8)$$

Data Augmentation. To train the network for better adaptation at arbitrary viewpoints, the training data is further augmented by 2D image transformations. Specifically, three types of transforms are adopted, including random translation, random scaling, and random rotation, that can be easily achieved by modifying the target camera intrinsic/extrinsic parameters.

Training and Inference. For training, one of the sample cameras is set as the target camera. This allows the use of the ground truth $I_q$ and $A_q$ to conduct supervised training. The end-to-end network updates the parameters by back-propagating the gradients of the loss function from 2D image to 3D point cloud. Adam optimizer is used for training with a learning rate of $3e^{-5}$ and a weight decay of $2e^{-4}$, along with warm-up periods. All trainings were conducted on a single 2080Ti with batch size 3. Each object's network is trained independently. Training takes around 24 hours. When doing inference, all network parameters are fixed and desire target viewpoint is set to point projection. It takes about 100 ms for rendering each novel viewpoint results.

4. Experiment Results

All experiments are conducted on a new fuzzy object dataset collected by the capture system as well as on synthetic data. Specifically, 7 different human hair styles and fuzzy toys are acquired.

For the synthetic data, additional models are also rendered Hair and Wolf. Virtual cameras are positioned on a sphere surrounding the object and use Blender to render 201 RGBA images as training data with another 200 for testing for each synthetic scene. The point cloud model for Hair is sampled from its original line model whereas the one for Wolf is reconstructed via visual hull reconstruction.

For real data, five objects are captured Cat, Human Hair, Hairstyle 1, Hairstyle 2, and Hairstyle 3. The capture system as discussed in Section 3.1 is used to acquire a total of 600 images as both training and testing data. For Cat and Human Hair, 224 images are used for training and for Hairstyle 1-3, 245 training images are used. The rest of the images are used for quantitative evaluations. For each real scene, the object is reconstructed into point clouds with 300,000 points. It is to be noted that NOPC can render arbitrary new viewpoints with very smooth transitions in both RGB and alpha. In network training and forward prediction steps, the target rendering resolution is set as 720×450 and the point feature dimension m is set as 32.

4.1 Comparisons

NOPC in accordance with embodiments of the present invention is compared with a number of conventional IBR and NR approaches below.

Ground Truth (GT). The captured/rendered images are resized to a resolution of 720 450, identical to the output of NOPC.

Point Cloud Rendering (PCR). RGB color are assigned to each point in the raw point cloud by directly projecting it onto the target camera(s) and blend the results when needed. PCR is used to show the poor quality of the recovered object geometry in contrast to the high NOPC rendering results.

Image-Based Opacity Hull (IBOH). Metashape is used to triangulate the point cloud and implement the IBOH with the same multi-view inputs as to NOPC.

RGB Neural Renderer (RGB-NR). This serves as an ablation study of NOPC where the rendering network is trained using the neural renderer of NOPC using the raw color of the points rather than the learned features (Section 3.2). This aims to illustrate that features learned from NOPC network reveal more valuable information than color.

RGBA-NR. The latest neural renderer is also extended to simultaneously output RGB and alpha. This approach is called as RGBA-NR. It serves as an ablation study where alpha encoder and decoder is removed. It's shown that compared with NOPC, RGBA-NR fails to produce fine details and produces incoherent alpha mattes across views.

Figure 7:
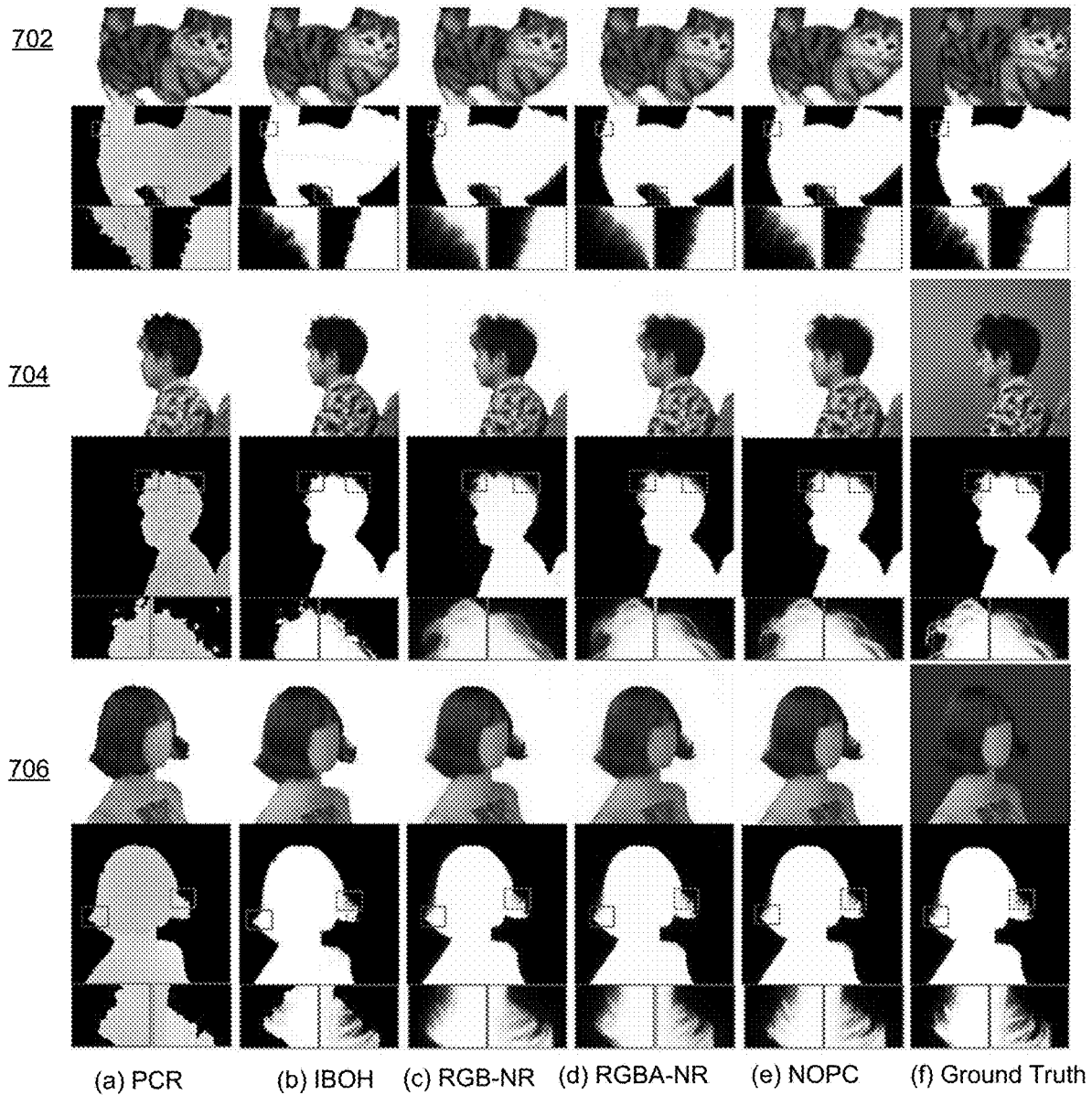
FIG. 7 is an exemplary diagram showing the visual comparisons between NOPC and prior arts on Cat, Human Hair and Hairstyle 1 in accordance with one embodiment of the present invention.

FIG. 7 is an exemplary diagram showing the visual comparisons between NOPC and prior arts on Cat 702, Human Hair 704 and Hairstyle 1 706 in accordance with one embodiment of the present invention. As shown in FIG. 7, visual discrepancies by using different approaches for sample real datasets of Cat 702, Human Hair 704 and Hairstyle 1 706 are presented. Compared with PCR and IBOH, NOPC, with the same noisy point cloud input, manages to correct many visual artifacts as well as preserves fine texture and geometric details. RGB-NR partially reduces noise and visual artifacts but introduces excessive blurs instead of alpha mattes. In contrast, both RGBA-NR and NOPC can better preserve details instead of blurs. This reveals that point-based features learned from the network manages to embed both local and contextual information beyond the original RGB color. As compared with RGBA- NR, NOPC captures very fine details in the alpha matte, largely attributed to the use of a separate alpha prediction branch missing in RGBA-NR.

Table 1 shows the quantitative comparisons where NOPC uniformly outperforms the state-of-the-art in accuracy. The results in terms of PSNR and SSIM measurements are the higher the better.

TABLE 1

| Method | | | IB OH | RGB-NR | RGBA-NR | NOPC |
|---|---|---|---|---|---|---|
| Hair | rgb | PSNR | 24.206 | 32.384 | 32.662 | 33.873 |
| | | SSIM | 0.799 | 0.893 | 0.882 | 0.909 |
| | alpha | PSNR | 17.718 | 32.280 | 32.370 | 32.559 |
| | | SSIM | 0.916 | 0.978 | 0.975 | 0.979 |
| Wolf | rgb | PSNR | 31.009 | 35.667 | 35.863 | 38.124 |
| | | SSIM | 0.938 | 0.941 | 0.947 | 0.962 |
| | alpha | PSNR | 25.919 | 34.144 | 34.402 | 35.296 |
| | | SSIM | 0.969 | 0.986 | 0.986 | 0.989 |
| Cat | rgb | PSNR | 26.763 | 33.187 | 33.023 | 33.548 |
| | | SSIM | 0.792 | 0.881 | 0.890 | 0.903 |
| | alpha | PSNR | 19.606 | 30.773 | 30.688 | 31.239 |
| | | SSIM | 0.932 | 0.973 | 0.972 | 0.976 |
| Human Hair | rgb | PSNR | 22.279 | 29.219 | 28.090 | 29.456 |
| | | SSIM | 0.853 | 0.939 | 0.927 | 0.945 |
| | alpha | PSNR | 20.668 | 26.201 | 28.685 | 29.286 |
| | | SSIM | 0.934 | 0.964 | 0.968 | 0.973 |
| Hairstyle 1 | rgb | PSNR | 28.098 | 27.851 | 28.452 | 29.078 |
| | | SSIM | 0.881 | 0.901 | 0.905 | 0.901 |
| | alpha | PSNR | 18.048 | 15.467 | 15.548 | 18.068 |
| | | SSIM | 0.908 | 0.885 | 0.886 | 0.907 |
| Hairstyle 2 | rgb | PSNR | 26.201 | 33.246 | 32.047 | 33.175 |
| | | SSIM | 0.856 | 0.935 | 0.921 | 0.933 |
| | alpha | PSNR | 17.088 | 28.689 | 27.298 | 30.085 |
| | | SSIM | 0.880 | 0.949 | 0.939 | 0.953 |
| Hairstyle 3 | rgb | PSNR | 24.250 | 25.647 | 30.486 | 30.846 |
| | | SSIM | 0.815 | 0.851 | 0.894 | 0.898 |
| | alpha | PSNR | 17.703 | 18.900 | 26.992 | 27.325 |
| | | SSIM | 0.892 | 0.895 | 0.925 | 0.939 |

Figure 8:
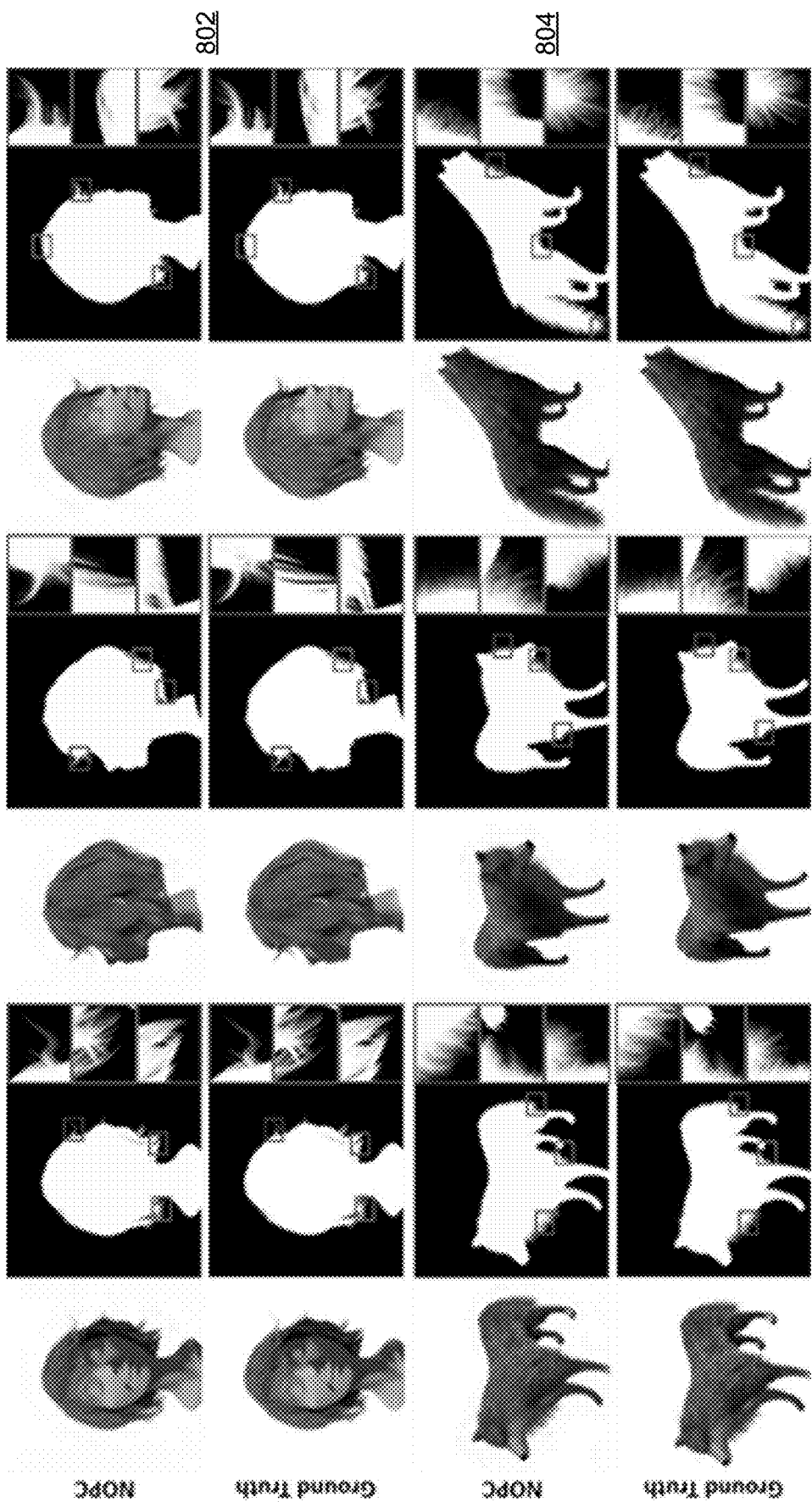
FIG. 8 is an exemplary diagram showing the visual comparisons between NOPC and ground truth on the synthetic Hair and Wolf datasets, in accordance with one embodiment of the present invention.
Figure 9:
FIG. 9 is an exemplary diagram showing the visual comparisons between NOPC and ground truth on four real datasets Cat, Human Hair, Hairstyle 2 and Hairstyle 3, in accordance with one embodiment of the present invention, wherein the green screens are substituted with new backgrounds using the NOPC alpha mattes.

FIG. 8 is an exemplary diagram showing the visual comparisons between NOPC and ground truth on the Synthetic Hair 802 and Wolf 804 datasets, in accordance with one embodiment of the present invention. FIG. 9 is an exemplary diagram showing the visual comparisons between NOPC and ground truth on four real datasets Cat 902, Human Hair 904, Hairstyle 2 906 and Hairstyle 3 908, in accordance with one embodiment of the present invention, wherein the green screens are substituted with new backgrounds using the NOPC alpha mattes. As shown in FIG. 8, the visual comparisons between NOPC and ground truth on the Synthetic Hair 802 and Wolf 804 datasets demonstrate that NOPC can product high quality alpha mattes comparable to the ground truth. Once the alpha matte at a new viewpoint is obtained, the background can be changed. As shown in FIG. 9, the green screens are substituted with new backgrounds using the NOPC alpha mattes, and the visual comparisons between NOPC and ground truth on four real datasets Cat 902, Human Hair 904, Hairstyle 2 906 and Hairstyle 3 908 demonstrate that NOPC can synthesize photo-realistic images on a new background.

Figure 10:
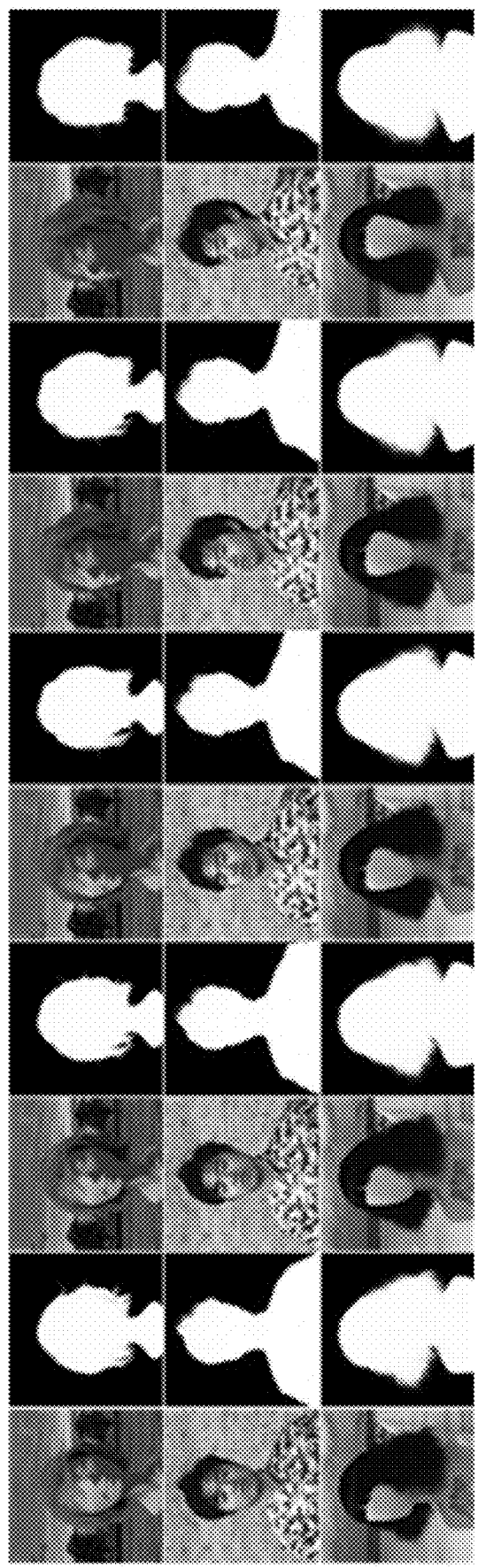
FIG. 10 is an exemplary diagram showing the free viewpoint rendering of three fuzzy models in accordance with one embodiment of the present invention, wherein the rendered RGB and alpha mattes maintain high coherence across the viewpoints.

A unique advantage of NOPC over the state-of-the-art techniques including RGBA-NR is its capability of preserving coherence across views. FIG. 10 is an exemplary diagram showing the free viewpoint rendering of three fuzzy models in accordance with one embodiment of the present invention, wherein the rendered RGB and alpha mattes maintain high coherence across the viewpoints. As shown in FIG. 10, the rendered RGB and alpha mattes maintain high coherence across the viewpoints. Notice that the original alpha mattes produced at the sample views may not even be coherent since they are individually processed. However, NOPC learns the features across all frames and can enforce their coherence when rendering at the same sample viewpoints. This is different from classical IBR where the rendered results are identical to the samples at the sample viewpoints. In contrast, NOPC re-renders at these viewpoints using the trained network and produces more coherent alpha mattes.

Figure 11:
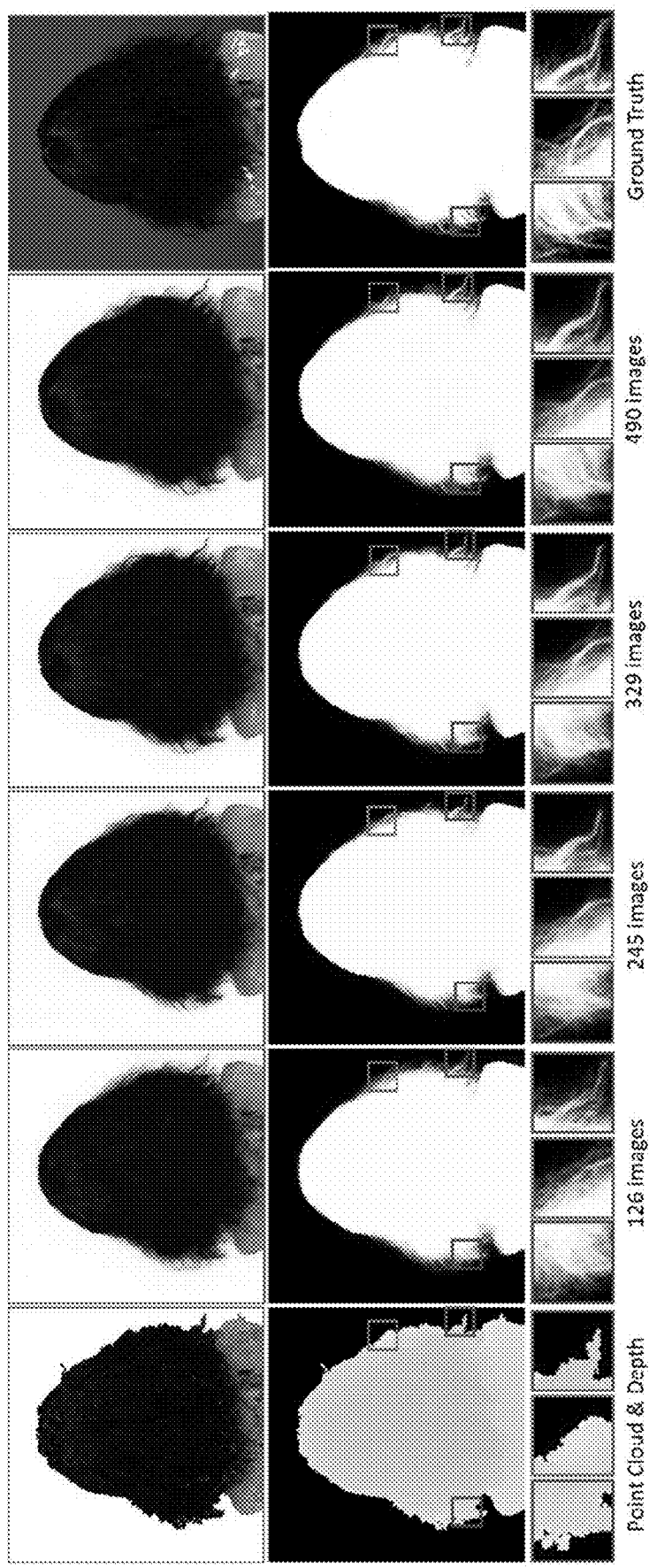
FIG. 11 is an exemplary diagram showing the NOPC rendering results using different sizes of training data, in accordance with one embodiment of the present invention.
Figure 12:
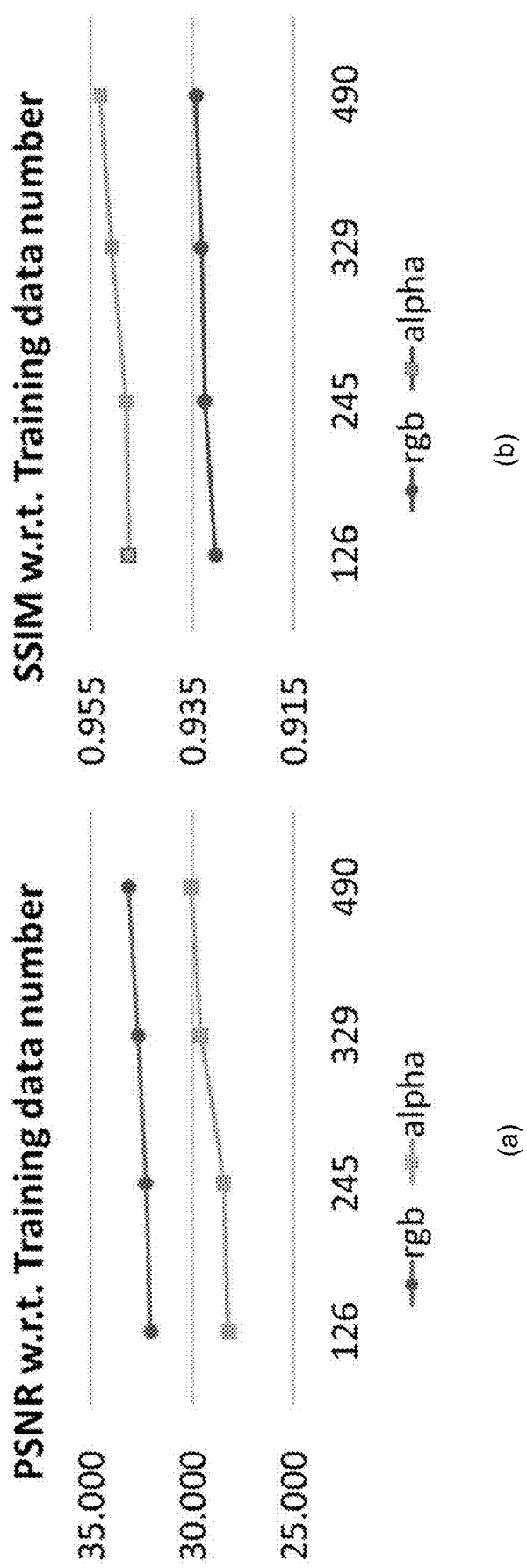
FIG. 12 is an exemplary line chart showing the quantitative comparisons (PSNR and SSIM) of the rendering quality on the Hairstyle 2 dataset using different training sizes in accordance with one embodiment of the present invention.

Finally, the effect of using different training sizes is demonstrated. Specifically, subsets of the training data of different sizes are randomly sampled. FIG. 11 is an exemplary diagram showing the NOPC rendering results using different sizes of training data, in accordance with one embodiment of the present invention. FIG. 12 is an exemplary line chart showing the quantitative comparisons (i.e., PSNR and SSIM) of the rendering quality on the Hairstyle 2 dataset using different training sizes in accordance with one embodiment of the present invention. As shown in FIG. 11, the NOPC rendering results using different sizes of training data demonstrate that more training data lead to better visual quality and higher accuracy, although NOPC can already produce satisfactory results when the training size reaches about 200 images. Such sparse data settings are ideal for hand-held captures, such as by using a smart phone. The challenge there though is reliable image registration on fuzzy objects. As shown in FIG. 12, the line chart of image (a) of FIG. 12 exhibits the quantitative comparisons of the rendering quality with respect to PSNR, while the line chart of image (b) of FIG. 12 exhibits the quantitative comparisons of the rendering quality with respect to SSIM.

The invention claimed is:

1. A method of rendering an object, the method comprising:
    encoding a feature vector to each point in a point cloud for an object, wherein the feature vector comprises an alpha matte;
    projecting each point in the point cloud and the corresponding feature vector to a target view to compute a feature map; and
    using a neural rendering network to decode the feature map into a RGB image and the alpha matte and to update the feature vector.

2. The method of claim 1, further comprising:
    rasterizing a point in the point cloud into a patch on the feature map, wherein a size of the patch is determined by a depth value of the point.

3. The method of claim 1, further comprising:
    associating each point in the point cloud with a set of pixels on the feature map.

4. The method of claim 1, further comprising:
    back-propagating a gradient of a loss function in the feature map to a gradient on the point cloud.

5. The method of claim 1, wherein the neural rendering network comprises a first encoder and a first decoder for processing the RGB image, and a second encoder and a second decoder for processing the alpha matte.

6. The method of claim 5, wherein the first encoder adopts U-Net architecture while replacing a convolutional layer in U-Net architecture with a gated convolution layer.

7. The method of claim 6, wherein the first encoder comprises one input convolution block and four downsampling blocks.

8. The method of claim 6, wherein the first decoder comprises one output convolution block and four upsampling blocks.

9. The method of claim 5, further comprising:
obtaining an input to each upsampling block of the first decoder by concatenating intermediate feature maps from both the first encoder and a previous upsampling block.

10. The method of claim 5, wherein the second encoder comprises one input convolution block and two downsampling blocks.

11. The method of claim 10, wherein the second decoder comprises one output convolution block and two upsampling blocks.

12. The method of claim 10, further comprising:
obtaining an input to each upsampling block of the second decoder by concatenating intermediate feature maps from both the first encoder and the second encoder.

13. The method of claim 1, further comprising:
capturing a plurality of images of the object by a plurality of cameras from a plurality of viewpoints; and
constructing the point cloud using an image-based visual hull construction.

14. The method of claim 13, further comprising:
rotating the object at a constant speed; and
capturing the plurality of images of the object at a fixed interval by the plurality of cameras from a plurality of viewpoints.

15. The method of claim 14, further comprising:
capturing images of a calibration pattern rotating at the constant speed by a calibration camera at the fixed interval.

16. The method of claim 13, further comprising:
calibrating the plurality of images of the object by calculating an extrinsic parameter of the calibration camera via a structure-from-motion (SFM) technique.

17. The method of claim 13, further comprising:
generating the alpha matte for each image by obtaining a foreground binary mask and refining the foreground binary mask by a deep neural network.

18. The method of claim 17, further comprising:
generating a trimap from the foreground binary mask.

19. The method of claim 17, wherein the deep neural network comprises two parallel encoder branches for extracting local feature and global contextual information.

20. The method of claim 17, further comprising:
constructing the point cloud of the object from the foreground binary mask using the image-based visual hull construction.

21. The method of claim 17, further comprising:
training the deep neural network using the images and the corresponding alpha mattes.

22. The method of claim 21, wherein one of the plurality of the cameras is set as a target camera.

23. The method of claim 21, further comprising:
back-propagating a gradient of a loss function of the images to the point cloud.

24. The method of claim 21, further comprising:
performing two-dimensional image transformation to the images.

25. The method of claim 1, wherein the object comprises hair.

* * * * *